United States Patent
Herold et al.

(10) Patent No.: US 11,020,856 B2
(45) Date of Patent: Jun. 1, 2021

(54) TRANSPORTATION VEHICLE AND METHOD FOR CONTROLLING A ROBOT

(71) Applicant: VOLKSWAGEN AG, Wolfsburg (DE)

(72) Inventors: Stephan Herold, Braunschweig (DE); Daniel Schütz, Lehre (DE)

(73) Assignee: Volkswagen AG

(*) Notice: Subject to any disclaimer, the term of this patent is extended or adjusted under 35 U.S.C. 154(b) by 331 days.

(21) Appl. No.: 16/037,911

(22) Filed: Jul. 17, 2018

(65) Prior Publication Data
US 2019/0030720 A1    Jan. 31, 2019

(30) Foreign Application Priority Data

Jul. 31, 2017   (DE) .................... 10 2017 213 161.6
Jan. 11, 2018   (DE) .................... 10 2018 200 435.8

(51) Int. Cl.
| | |
|---|---|
| *B25J 9/16* | (2006.01) |
| *B25J 11/00* | (2006.01) |
| *B67D 7/04* | (2010.01) |

(52) U.S. Cl.
CPC .......... *B25J 9/1694* (2013.01); *B25J 9/1661* (2013.01); *B25J 9/1674* (2013.01); *B25J 9/1687* (2013.01); *B25J 11/00* (2013.01); *B67D 7/0401* (2013.01); *B67D 2007/0403* (2013.01); *B67D 2007/0453* (2013.01); *G05B 2219/2629* (2013.01); *G05B 2219/40111* (2013.01)

(58) Field of Classification Search
CPC ...... B25J 9/1694; B25J 9/1661; B25J 9/1674; B25J 9/1687; B67D 7/0401; B67D 2007/0403; B67D 2007/0453; G05B 2219/2629; G05B 2219/40111
See application file for complete search history.

(56) References Cited

U.S. PATENT DOCUMENTS

| | | | | |
|---|---|---|---|---|
| 5,671,786 | A * | 9/1997 | Corfitsen | B25J 9/1679 141/231 |
| 6,237,647 | B1 * | 5/2001 | Pong | B67D 7/0401 141/231 |
| 8,393,362 | B1 * | 3/2013 | Hollerback | B25J 11/00 141/94 |
| 9,482,524 | B2 * | 11/2016 | Metzler | G01B 21/04 |
| 9,776,326 | B2 * | 10/2017 | Zevenbergen | B25J 5/00 |

(Continued)

FOREIGN PATENT DOCUMENTS

| | | |
|---|---|---|
| DE | 19962969 A1 | 7/2001 |
| DE | 10117539 A1 | 10/2002 |

(Continued)

OTHER PUBLICATIONS

Search Report for German Patent Application No. 10 2018 200 435.8; dated Jun. 4, 2018.

(Continued)

*Primary Examiner* — Nicholas Kiswanto
(74) *Attorney, Agent, or Firm* — Barnes & Thornburg LLP

(57) ABSTRACT

A transportation vehicle having a data interface for transmitting data to a robot, wherein the transportation vehicle includes a controller that produces control signals for controlling the robot for a specified working task and transmits the control signals to the robot via the data interface. Also disclosed is a method for controlling a robot by a transportation vehicle.

12 Claims, 1 Drawing Sheet

(56) References Cited

U.S. PATENT DOCUMENTS

| | | | |
|---|---|---|---|
| 9,800,321 B2* | 10/2017 | Sham | H04B 7/18504 |
| 9,833,901 B2* | 12/2017 | Perrone | B25J 9/1661 |
| 10,022,867 B2* | 7/2018 | Saboo | B25J 5/007 |
| 10,054,400 B2* | 8/2018 | Szlemko | F41F 1/085 |
| 10,105,844 B2* | 10/2018 | Tan | B25J 9/1633 |
| 10,207,411 B2* | 2/2019 | Michalakis | B60L 53/35 |
| 10,471,595 B2* | 11/2019 | Tan | B25J 19/023 |
| 10,613,544 B2* | 4/2020 | Guterman | G05D 1/0088 |
| 2012/0004774 A1* | 1/2012 | Umetsu | B25J 15/0009 |
| | | | 700/254 |
| 2012/0233062 A1* | 9/2012 | Cornish | B60L 53/35 |
| | | | 705/39 |
| 2016/0271796 A1 | 9/2016 | Babu | |
| 2017/0322555 A1* | 11/2017 | nikolic | G05D 1/0088 |
| 2018/0001777 A1* | 1/2018 | Kilic | B60L 53/65 |
| 2018/0222059 A1* | 8/2018 | Ragula | G05D 1/0038 |
| 2018/0297209 A1* | 10/2018 | Low | B25J 13/08 |
| 2019/0224846 A1* | 7/2019 | Pivac | G05B 19/4097 |

FOREIGN PATENT DOCUMENTS

| | | |
|---|---|---|
| DE | 10304284 A1 | 8/2004 |
| DE | 102006052903 A1 | 8/2008 |
| DE | 102012024865 A1 | 6/2014 |
| DE | 102016006555 A1 | 2/2017 |
| DE | 102016004889 A1 | 10/2017 |
| DE | 112011100367 B4 | 2/2018 |
| EP | 1345099 A2 | 9/2003 |

OTHER PUBLICATIONS

VW e-smartConnect; You Tube Video; downloaded from https://www.youtube.com/watch?v=-9VulKSy5uw; Jul. 15, 2015.

* cited by examiner

TRANSPORTATION VEHICLE AND METHOD FOR CONTROLLING A ROBOT

PRIORITY CLAIM

This patent application claims priority to German Patent Application Nos. 10 2017 213 161.6, filed 31 Jul. 2017, and 10 2018 200 435.8, filed 11 Jan. 2018, the disclosure of which is incorporated herein by reference in its entirety.

SUMMARY

Illustrative embodiments relate to a transportation vehicle and a method for controlling a robot.

BRIEF DESCRIPTION OF THE DRAWINGS

Further features and details of the disclosure arise from the following description of an exemplary embodiment and using the drawing. The combinations of features mentioned in the description and the features and combinations of features mentioned below in the description of the figures and/or indicated in the figures alone can be used not only in the specified combination, but also on their own, without departing from the scope of the disclosure.

In the figures.

In the figures, identical or functionally identical elements have been provided with the same reference characters.

DETAILED DESCRIPTION

Figure 1:
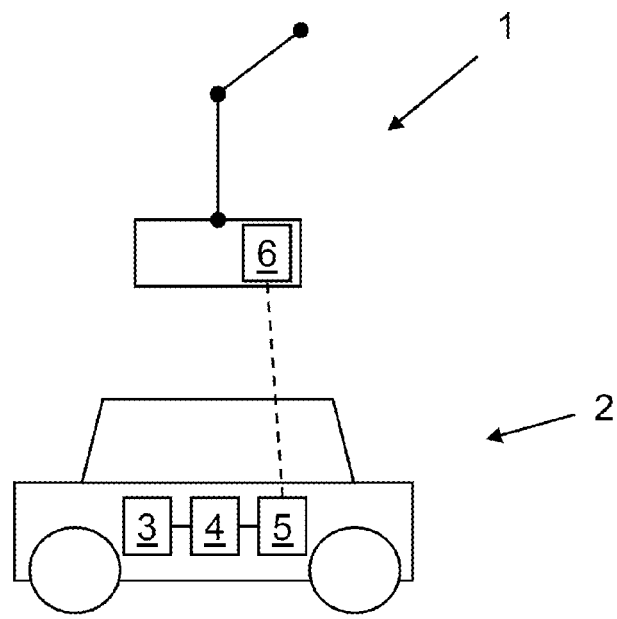
FIG. 1 shows a schematic representation of a transportation vehicle comprising a controller that is arranged to control a robot.

Nowadays, robots are used in diverse application areas. For example, a number of robots are used in transportation vehicle production, for example, for producing weld seams, during fitting procedures or similar. Similarly robots are increasingly being used with electrically powered transportation vehicles to assist charging procedures. Usually, depending on the task that is to be performed by the robots, it is necessary for the robot to have a more or less complex controller, i.e., control hardware.

The use of a robot to fill an energy storage device of a transportation vehicle is revealed in DE 10 2012 024 865 A1, for example. Wireless communications are initiated between a control system in the transportation vehicle and the robot for transmitting data. As a result, inter alia position data can be transmitted from the robot to the transportation vehicle or even from the transportation vehicle to the robot. For this purpose, the transportation vehicle comprises a data interface for transmitting the data to the robot. Position data may be transmitted from the robot to the transportation vehicle, so that the transportation vehicle can then be positioned autonomously relative to the robot.

DE 10 2016 006 555 A1 reveals a docking station for accepting and charging a drone in the vicinity of the top of a transportation vehicle. By the docking station, an energy storage device in the drone can be charged up as long as it is docked with the docking station.

US 2016/0271796 A1 reveals a system for painting a transportation vehicle. The positioning and orientation of the transportation vehicle can be determined by a drone. Related data are transmitted to a controller outside the transportation vehicle, which actuates a painting robot depending on the data, which then paints the transportation vehicle.

Disclosed embodiments provide an efficient solution for the operation of robots. Disclosed embodiments also relate to a transportation vehicle and a method for controlling a robot.

The disclosed transportation vehicle comprises a data interface for transmitting data to a robot. The disclosed transportation vehicle is characterized by a controller that is arranged to produce control signals for controlling the robot for a specified working task and to transmit the control signals to the robot via the data interface. As a result, it is possible that control and regulation hardware of the robot, for example, for production applications or services, can be dispensed with by using the control hardware of the transportation vehicle as the controller for controlling the relevant robot. As a result, the acquisition cost of the relevant robot can be drastically reduced. Exemplary embodiments of the disclosed transportation vehicle allow for transportation vehicles of future generations that are designed to constitute diverse and also new types of functionalities with an old robot mechanism.

In other words, the data interface is thus used as a communications interface between the transportation vehicle and the relevant robot. In the ideal case, the robot only has to comprise drives, drive boosters and a dedicated data interface compatible with the data interface in the transportation vehicle. All necessary control hardware on the robot side in conventional solutions to date can be omitted owing to the disclosed solution, because all control tasks of the robot can be carried out by the controller in the transportation vehicle. This is because decentralized robot control is possible by the transportation vehicle.

Disclosed embodiment provide that the transportation vehicle comprises a sensor arrangement that is designed to detect a posture of the robot and/or axle positions of the robot and to transmit related data to the controller, which is arranged to produce the control signals depending on the data. In other words, a sensor-controlled application can thus be carried out by the transportation vehicle sensor arrangement that is present in the transportation vehicle. The sensor arrangement in the transportation vehicle measures the current posture of the robot relative to the transportation vehicle, optionally also of a tool attached to the robot, and the position of the robot mechanism relative to the axle position thereof and/or relative to the positioning and orientation of a mobile platform of the robot, and calculates all information for achieving a target posture or a target position. Then the transportation vehicle transmits, as control signals, corresponding axle positions at each control or regulation cycle time. The transportation vehicle thus carries out not only the actual control of the robot with the controller thereof, but also the monitoring of the robot by sensor. As a result, for example, permanent position monitoring of the robot is possible, so that depending on the known orientation and positioning of the robot, the controller can produce corresponding control signals for the optimal performance of the working task and can transmit the control signals to the robot via the data interface. The sensor arrangement in the transportation vehicle can, for example, also be used for diverse other applications in the transportation vehicle, such as, for example, autonomous transportation vehicle tasks and similar. In other words, a sensor arrangement that is already used or installed in the transportation vehicle anyway is used to detect the posture of the robot and/or the axle position of the robot to actuate the robot accordingly on the transportation vehicle side.

Disclosed embodiments provide that the controller is arranged to carry out safety monitoring of the robot and to produce the control signals depending on the safety monitoring. The safety monitoring can, for example, be incorporated in the data provided by the sensor arrangement in the transportation vehicle, so that the controller in the transportation vehicle can also be additionally used for safety monitoring and not only just for control in relation to satisfying the working task. For example, as a result it is possible to provide no sensor arrangement at all on the robot itself for safety monitoring and/or for performing a certain working task. Instead, the entire related sensor arrangement is provided on the transportation vehicle side and is used by the controller to provide such control signals for controlling the robot, by which the specified working task can be carried out well and efficiently on the one hand and can also be carried out safely on the other hand.

Disclosed embodiments provide that the data interface is designed to transmit the control signals to the robot by a wireless and/or cable-based transmission method. Both the data interface in the transportation vehicle and the data interface on the robot side that is compatible therewith can, for example, be embodied as a plug and socket pair or similar, so that cable-based data transmission of the control signals can be carried out. Alternatively or additionally, it is also possible, for example, that wireless transmission methods are used, for example, over a mobile radio connection, such as, for example, LTE or similar, WLAN, via a Car-2-X interface or similar. The suitable transmission methods can be selected depending on boundary conditions and the bandwidth necessary for the control of the robot Disclosed embodiments provide that the controller is arranged to control at least one transportation vehicle function, in particular, for autonomous driving of the transportation vehicle. The controller is not only present and arranged to control the robot. Rather, the controller is also used to control one or various transportation vehicle functions of the transportation vehicle in normal transportation vehicle operation, such as, for example, autonomous driving functions, other driver assistance systems, infotainment systems or similar. The controller in the transportation vehicle thus has at least a dual functionality, namely the control of the robot on the one hand and also the control of the transportation vehicle on the other hand. On the hardware side, as a result the transportation vehicle is thus not more expensive at all or is only marginally more expensive, because a controller that is necessary anyway for the operation of the transportation vehicle is also used for controlling the robot.

Disclosed embodiments provide that the controller is arranged to load robot-specific parameters for controlling the robot via the data interface. For example, it is possible that the data interface in the transportation vehicle is designed to access a database via the Internet, and to download the robot-specific parameters, which are necessary or are to be complied with for controlling the robot. Alternatively or additionally, it is also possible that the robot-specific parameters are directly downloaded from the robot via the data interface. Either way, it is possible as a result that the controller can adapt very well to the relevant robot that is to be controlled by the controller. Further, as a result it also possible, for example, that in addition to the robot-specific parameters, individual software blocks or software packets can also be downloaded, for example, so that the controller can use the software blocks to produce the control signals.

In disclosed embodiments, it is provided that the controller is arranged to carry out path planning for the robot for the working task and to produce the control signals depending on the path planning. By the controller in the transportation vehicle, setting up the robot can also be used in relation to path planning, wherein additionally the controller in the transportation vehicle can also be designed to carry out interpolation during path planning, peripheral control of peripheral devices of the robot and similar. All control hardware necessary for setting up the robot can thus be replaced by the controller in the transportation vehicle. This in turn saves significant costs.

Disclosed embodiments provide that the transportation vehicle comprises a user interface for controlling the robot. For example, a touchscreen or similar installed in the transportation vehicle can be used for this purpose. As a result, it is possible that user interfaces that are otherwise originally present on the robot itself can be saved. The costs for the robot can as a result be further reduced, wherein the user interface in the transportation vehicle can also be used for diverse other tasks in the transportation vehicle, such as, for example, for controlling an infotainment system or similar.

The disclosed system comprises the exemplary transportation vehicle or an embodiment of the transportation vehicle and at least one robot comprising a data interface that is compatible with the data interface of the transportation vehicle.

With the disclosed method for controlling a robot by the disclosed transportation vehicle or an embodiment of the disclosed transportation vehicle, control signals for controlling the robot for a specified working task are produced by the controller of the transportation vehicle and are transmitted to the robot via the data interface. Embodiments of the disclosed transportation vehicle are to be viewed as embodiments of the disclosed method and vice versa, wherein the transportation vehicle comprises a method or mechanism for carrying out the operations of the method.

Disclosed embodiments provide that the robot is used for carrying out at least one production operation during the manufacture of the transportation vehicle. Alternatively or additionally, it is also possible that the robot or another robot is used for refueling the transportation vehicle. In addition, it is alternatively or additionally possible that the robot or another robot is used for a maintenance task on the transportation vehicle. In principle, it is possible by the method to actuate diverse robots by the controller in the transportation vehicle, whether during the production of the transportation vehicle, for transportation vehicle maintenance purposes, for refueling the transportation vehicle or for any other tasks that the robot can carry out on the transportation vehicle. Moreover, it is also possible that the controller in the transportation vehicle is used to actuate a robot that is carrying out certain working task not on the transportation vehicle itself.

A robot 1 and a transportation vehicle 2 are shown in a highly schematic representation in FIG. 1. The transportation vehicle 2 can control the robot 1. For monitoring and control of the robot 1, the transportation vehicle 2 comprises a sensor arrangement 3 in the transportation vehicle, a controller 4 in the transportation vehicle and a data interface 5 in the transportation vehicle. The controller 4 is arranged to produce control signals for controlling the robot 1 for a specified working task and to transmit the control signals to the robot 1 via the data interface 5 in the transportation vehicle. So that the control signals can pass from the transportation vehicle 2 to the robot 1, the robot 1 itself comprises a data interface 6 on the robot side that is compatible with the data interface 5 in the transportation vehicle.

The sensor arrangement 3 in the transportation vehicle is designed to detect a posture of the robot 1 and/or axle positions of the robot 1 and to transmit related data to the controller 4, which for its part is arranged to produce the control signals depending on the data. Using the sensor arrangement 3 in the transportation vehicle, it is also possible to carry out safety monitoring of the robot 1 during operation, wherein corresponding control signals for controlling the robot 1 are produced by the controller 4 in the transportation vehicle depending on the safety monitoring.

Both data interfaces 5, 6 can be designed to transmit or receive the control signals by a wireless and/or cable-based transmission method. In principle, all known types of cable-based and wireless transmission methods are conceivable, so that, for example, transmission of the control signals via a mobile radio network, via WLAN or similar is possible. Moreover, the data interfaces 5, 6 can also be embodied as a plug and a socket, for example, so that the robot 1 can be wired directly to the transportation vehicle 2.

Figure 2:
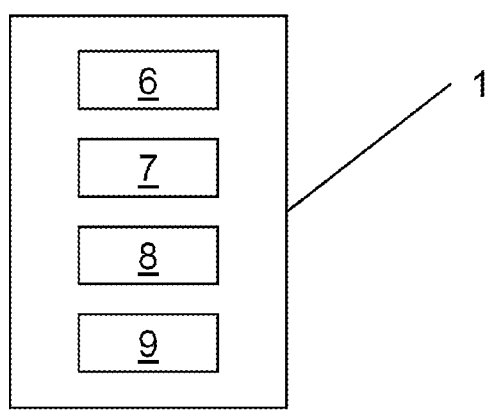
FIG. 2 shows a schematic representation of the robot, wherein individual function units of the robot are represented schematically.

In FIG. 2, the robot 1 is again represented highly schematically. In addition to the data interface 6 on the robot side, the robot 1 comprises drives 7, a drive booster 8 and a power supply 9. The robot 1 itself thus needs hardly any control or regulation hardware, because all control tasks are carried out by the transportation vehicle 2, in particular, by the controller 4 in the transportation vehicle. The robot 1 can as a result be manufactured beneficially. The controller 4 in the transportation vehicle and the sensor arrangement 3 in the transportation vehicle can also be used to monitor and control functions in the transportation vehicle, such as, for example, autonomous transportation vehicle tasks, other driver assistance systems, infotainment systems and similar. The sensor arrangement 3 in the transportation vehicle and the controller 4 in the transportation vehicle thus satisfy at least a dual functionality, namely the monitoring and control of the transportation vehicle 2 itself and the monitoring and control of the robot 1. The transportation vehicle 2 is thus not necessarily equipped differently in hardware terms than is the case with known transportation vehicles that are not arranged to control such a robot 1.

The controller 4 in the transportation vehicle is also arranged to load robot-specific parameters for controlling the robot 1 via the data interface 3 in the transportation vehicle. For example, a set of parameters can be downloaded to the robot 1 from a database via an Internet connection and via the data interface 5 in the transportation vehicle. Alternatively or additionally, it is also possible that relevant robot-specific parameters that are necessary for controlling the robot 1 are taken directly from the robot 1 by carrying out a corresponding exchange of data via the data interfaces 5, 6. Knowing the robot-specific parameters, it is possible that the controller 4 also conducts path planning for the robot 1 for a certain working task and produces the control signals depending on the path planning.

Using hardware in the transportation vehicle, in particular, the controller 4 in the transportation vehicle, it is possible that the robot 1 or even another robot can already be actuated during the production of the transportation vehicle 2, for example, to carry out welding tasks or even assembly tasks on the transportation vehicle 2 itself during manufacture. Using the robot 1 in production can be cost-effective, because the same requires no dedicated control and/or regulation hardware. In addition, following completion of the transportation vehicle 2, the controller 4 in the transportation vehicle can be used for controlling the robot 1 or another robot. For example, if the transportation vehicle 2 is an electrically powered transportation vehicle, then the controller 4 can actuate a refueling robot, which, for example, plugs a charging cable into the transportation vehicle 2 fully automatically and charges a battery in the transportation vehicle 2. Equally, a refueling robot can also be used to fill conventional fuel such as gasoline or diesel into the transportation vehicle 2. Moreover, it is, for example, also possible that the controller 4 in the transportation vehicle actuates the robot 1 or another robot that carries out maintenance tasks on the transportation vehicle 2, for example, in connection with a service schedule or similar. As a result, robots can also be used inexpensively in service workshops, because the actual control of the robots can be carried out on the transportation vehicle side. Moreover, it is possible by the transportation vehicle 2, in particular, using the controller 4 in the transportation vehicle, to actuate and control diverse robots, even if the robots are not directly carrying out tasks on the transportation vehicle 2 itself.

REFERENCE CHARACTER LIST 1 robot
2 transportation vehicle
3 sensor arrangement in the transportation vehicle
4 controller in the transportation vehicle
5 data interface in the transportation vehicle
6 data interface on the robot side
7 drives
8 drive booster
9 power supply

The invention claimed is:

1. A transportation vehicle comprising:
a data interface for transmitting data to a robot;
a controller that produces control signals for controlling the robot for a specified working task and for transmitting the control signals to the robot via the data interface; and
a sensor arrangement configured to detect a posture of the robot and/or axle positions of the robot, to calculate all information for achieving a target posture or a target position based on the sensed posture and/or axle position, and to transmit corresponding axle positions to the controller that produces the control signals depending on the calculation.

2. The transportation vehicle of claim 1, wherein the controller carries out safety monitoring of the robot and produces the control signals depending on the safety monitoring.

3. The transportation vehicle of claim 1, wherein the data interface transmits the control signals to the robot by a wireless and/or cable-based transmission method.

4. The transportation vehicle of claim 1, wherein the controller controls at least one transportation vehicle function for autonomous driving of the transportation vehicle.

5. The transportation vehicle of claim 1, wherein the controller loads robot-specific parameters for controlling the robot via the data interface.

6. The transportation vehicle of claim 1, wherein the controller carries out path planning for the robot for the working task and produces the control signals depending on the path planning.

7. The transportation vehicle of claim 1, wherein the transportation vehicle comprises a user interface for controlling the robot.

8. A system comprising:
a transportation vehicle including a data interface for transmitting data to a robot and a controller that produces control signals for controlling the robot for a specified working task and for transmitting the control signals to the robot via the data interface;
a sensor arrangement configured to detect a posture of the robot and/or axle positions of the robot, to calculate all information for achieving a target posture or a target position based on the sensed posture and/or axle position, and to transmit corresponding axle positions to the controller that produces the control signals depending on the calculation; and
at least one robot comprising a data interface that is compatible with the data interface of the transportation vehicle.

9. A method for controlling a robot by a transportation vehicle including a data interface for transmitting data to a robot and a controller that produces control signals for controlling the robot for a specified working task and for transmitting the control signals to the robot via the data interface, wherein the method comprises the controller producing control signals for controlling the robot for a specified working task and transmitting the control signals to the robot via the data interface a detecting a posture of the robot and/or axle positions of the robot via a sensor system, calculating all information for achieving a target posture or a target position based on the sensed posture and/or axle position, and transmitting corresponding axle positions to the controller that produces the control signals depending on the calculation.

10. The method of claim 9, wherein the robot carries out at least one production operation during the manufacture of the transportation vehicle.

11. The method of claim 9, wherein the robot or another robot is used for refueling the transportation vehicle.

12. The method of claim 9, wherein the robot or another robot is used for a maintenance task on the transportation vehicle.

* * * * *